March 31, 1942.  F. W. GUIBERT ET AL  2,277,699
INDICATING DEVICE
Filed Aug. 14, 1939    2 Sheets-Sheet 1
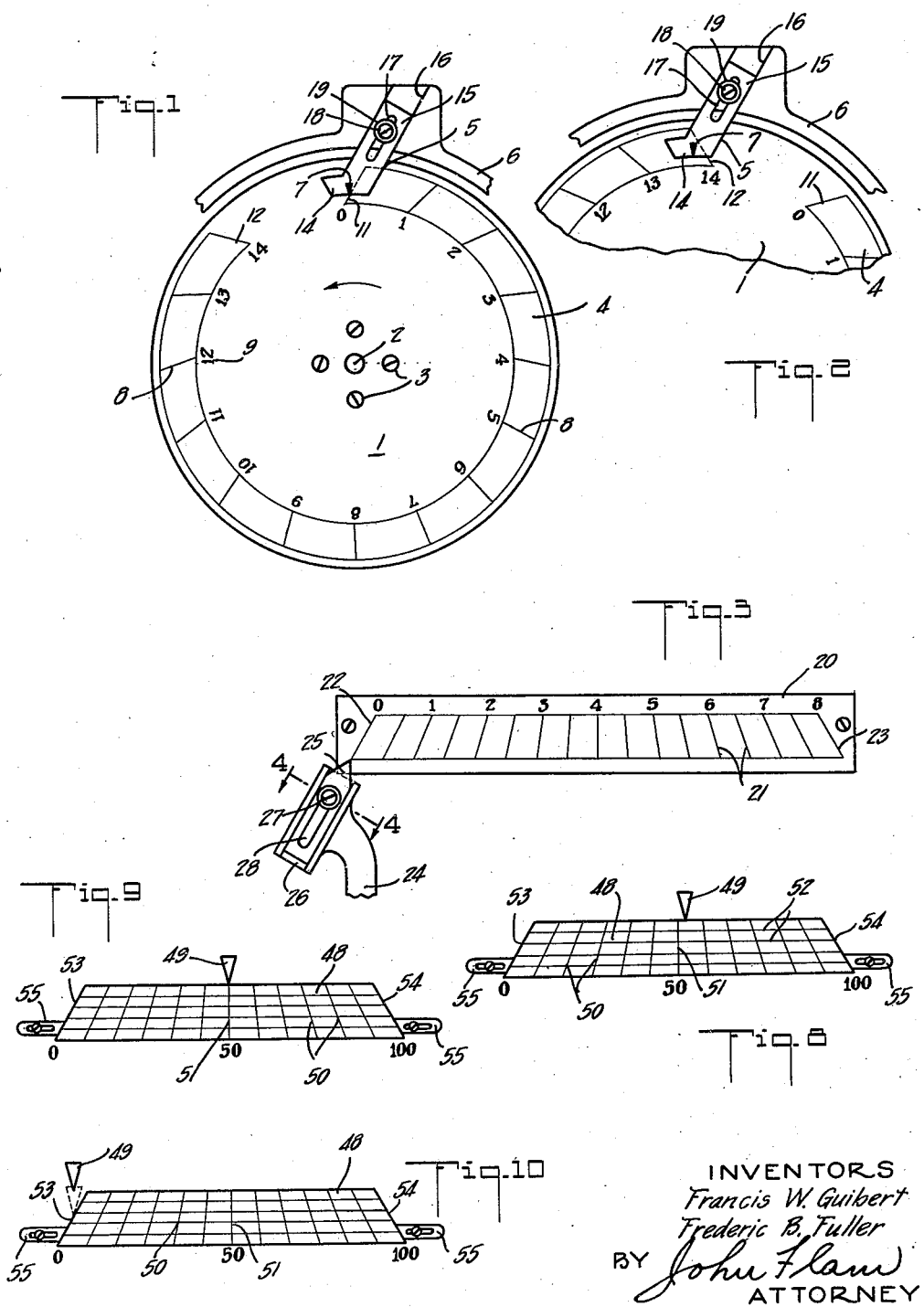
INVENTORS
Francis W. Guibert
Frederic B. Fuller
BY John Flam
ATTORNEY March 31, 1942. F. W. GUIBERT ET AL 2,277,699
INDICATING DEVICE
Filed Aug. 14, 1939 2 Sheets-Sheet 2
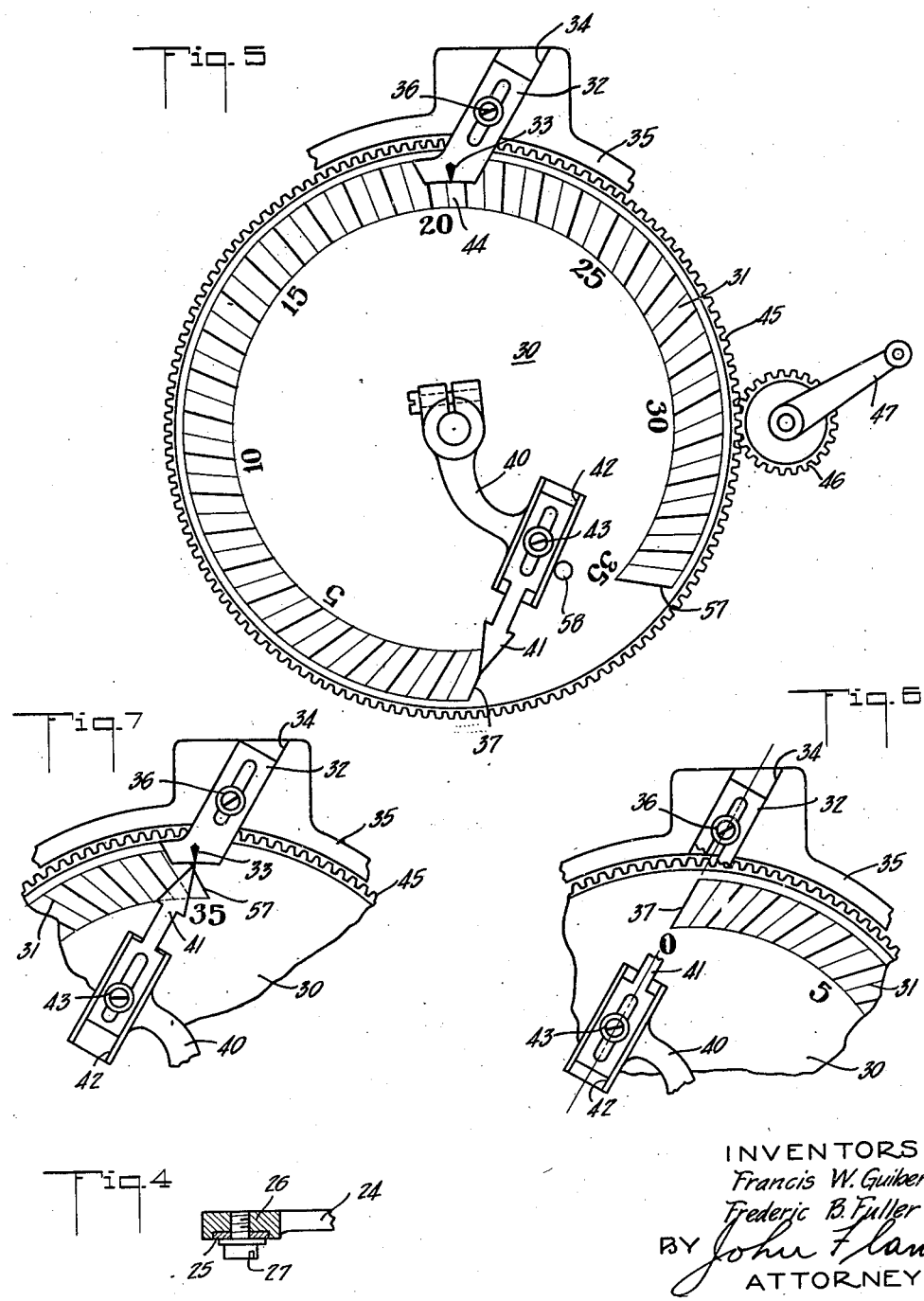
INVENTORS
Francis W. Guibert
Frederic B. Fuller
BY John F. Lane
ATTORNEY Patented Mar. 31, 1942

2,277,699

UNITED STATES PATENT OFFICE 2,277,699

INDICATING DEVICE

Francis W. Guibert, Beverly Hills, and Frederic B. Fuller, Whittier, Calif.; said Fuller assignor to said Guibert Application August 14, 1939, Serial No. 290,008

8 Claims. (Cl. 116—129)

This invention relates to indicator mechanism, and especially to a scale and pointer mechanism in which either the scale or pointer moves in acordance with the quantity indicated. Such mechanism may be used with a wide variety of apparatus, for example, electrical measuring instruments, chronometers, weighing devices, metering devices for gases or liquids, temperature indicators, pressure gauges, etc.

In the manufacture of such devices, it is frequently necessary to apply corrections to, or to calibrate, the indications, to bring the indicated quantity into harmony with the true or metered quantity. Especially is this true when such devices are manufactured in quantity by machinery. Although the scales are readily made substantially identical, to provide a sufficiently close tolerance for the rest of the device so that its measuring function will closely agree with the scale is often difficult and may be prohibitive from the standpoint of cost. Further, due to wear or other conditions incident to use, the amount or percent of difference needed for correction may change.

It is an object of this invention to provide an indicator having improved means of calibration.

In an application filed under Serial Number 257,318, in the names of Francis W. Guibert and Frederic B. Fuller, on February 20, 1939, entitled "Indicating mechanism," indicating devices are described in which corrections in the scale readings may be accomplished by adjustment of the relative positions of the pointer and scale. Briefly, those devices incorporate a scale having scale marks and a pointer relatively movable transversely to the marks, in accordance with the measured quantity. The path traversed by the index end of the pointer during the measuring or indicating operation intersects the scale marks. By varying the length of the pointer or by bodily moving the scale with respect to the pointer, this transverse path may be adjusted to intersect the scale marks at any desired points along their lengths. Accordingly by appropriate design of the direction or slope of the index lines, the indicated quantities differ and are functions of the particular transverse path chosen.

While such an arrangement seems entirely satisfactory, the steps needed for calibration may entail some complications. The calibration is most conveniently based upon the use of the indicator in connection with an accurately predetermined quantity; and the scale and pointer must be so adjusted when the device is intended to indicate this quantity, that the indication is accurate both at the zero point and at the predetermined quantity indication. Thus the calibration may involve successive adjustment of the positions of both the scale and the pointer to effect this result. It is another object of this invention to simplify the calibration, by making it necessary to adjust but one of the indicator elements.

It is still another object of this invention to provide a novel scale and pointer which cooperates in such a way as to greatly simplify the operation of calibration.

This invention possesses many other advantages and has other objects which may be made more easily apparent from a consideration of several embodiments of the invention. For this purpose there are shown a few forms in the drawings accompanying and forming part of the present specification. These forms, which illustrate the general principles of the invention, will now be described in detail; but it is to be understood that this detailed description is not to be taken in a limiting sense, since the scope of the invention is best defined by the appended claims.

In the drawings:

Figure 1 is a front view of an indicator device embodying the invention;

Fig. 2 is a fragmentary view of the indicator of Fig. 1, but in a different position;

Fig. 3 is a veiw similar to Fig. 1, showing a modified form of the invention;

Fig. 4 is a fragmentary enlarged sectional view taken along plane 4—4 of Fig. 3;

Fig. 5 is a front view of a further modification of the invention;

Figs. 6 and 7 are fragmentary views of the indicator of Fig. 5 showing different positions of the scale and pointer; and Figs. 8, 9 and 10 are diagrams utilized in explaining the manner in which the calibration process may be effected.

In order to explain the problems that arise in connection with calibration, attention is directed to Figs. 8, 9 and 10. In this instance a scale 48 is shown, with which cooperates a pointer index 49. The scale for the sake of simplicity, is shown of linear form, and either the scale or the pointer may be moved in accordance with the quantity measured or indicated. The scale 48 is arbitrarily shown as having a maximum indication of 100 units—as of time, volume, temperature, weight or other measurable quantity. The scale may be movable say toward the left as the indicator operates.

Across the width of the scale, there extend the scale marks 50. The scale is purposely made rather wide, so that the transverse path of the pointer index 49 may be adjusted to correspond to any path extending along the length of scale 48 and parallel to the indicating motion. Accordingly, the lines 50 may be so drawn that the indications are a function of this transverse path. For example, in the form shown in Figs. 8, 9 and 10, the middle line 51, corresponding to an indication of half the maximum, is shown as truly normal to the path of indicating travel; but the lines 50 on either side are drawn so as to converge upwardly upon a point on the extension of line 51. Accordingly, the farther the pointer mark 49 is from the lower edge of scale 48, the greater the readings are for equal indicating movements.

By appropriate choice of the configuration of each of the lines 50, however, the variations in reading for any extent of indicating motion may be predetermined. If for example, all of the scale lines 50 converge to a common point, it is easy to demonstrate, by elementary geometry, that the correction factor along any transverse path, would be constant for all scale readings. For example, the four longitudinal lines 52 may be marked on the scale and separated sufficiently to correspond to increments in the correction factor by one percent. In other words, the reading when taken at the top edge of scale 48 would be always five percent greater than the reading would have been on the lower edge for the same indicating movement. However, the lines 50 may if required be curved or broken or have non-converging inclinations so as to provide different corrections at different portions of the scale. The example illustrated is merely chosen for the sake of simplicity.

It is also unnecessary to provide a truly normal line 51 at a central portion of the scale; but it is convenient to do so, for in that manner, even the extreme mark, corresponding to the maximum indication, would not have a steep inclination to the normal direction. Thus in the example chosen the zero line 53 and the maximum indicating line 54 are equally and oppositely inclined, toward the normal line 51.

We are now ready to describe the calibrating steps. The indicator is rendered operative, to indicate a definite accurately predetermined quantity, corresponding to the normal line indication 51; in this instance, this quantity may be fifty amperes, or fifty volts, or fifty gallons, or fifty pounds, or fifty minutes, etc. Let us assume that the scale however moves to the position of Fig. 8, showing a plus error. The first step is to adjust the pointer 49 or the scale 48 while the indicator still responds to the amount to be measured so as to bring the pointer to the correct indication. This step is shown in Fig. 9, and is accomplished by moving the scale or pointer in a direction corresponding to the indicating movement, and as permitted by the adjustable supports 55. Then the indicator is released to enable it to return to the zero position. This returned position is shown in Fig. 10. Then lastly the pointer 49 must be adjusted to bring it accurately to the zero line 53, as shown in the dotted line position at the left of Fig. 10. It is thus seen that two adjusting acts must be performed in this method; one to bring the normal line 51 and the index 49 together; and then a transverse movement after a return of the indicator to zero, to bring the index 49 onto the zero line 53.

By the aid of the present invention, but one calibrating adjustment is necessary.

In the form of the invention illustrated in Figs. 1 and 2, a scale member or dial 1 is shown as of arcuate form and as being the moving member of the indicator mechanism. The dial 1 is supported for angular movement about its center 2, being suitably secured to a rotary element of the metering or other measuring mechanism as by screws 3. Dial 1 carries an arcuate scale 4 concentric about the center 2; this scale may extend for nearly the entire circumference of the dial as shown, or may extend for only a limited portion thereof. A pointer 5 is supported so as to be stationary with respect to the dial 1, as for example by means of the indicator housing 6. Pointer 5 carries a suitable index mark 7 to cooperate with scale 4.

The indicia of scale 4 consists of a plurality of scale marks or lines 8 arranged generally in a direction transverse to the direction of relative motion between the scale and the pointer 5. The scale marks 8 are shown as being provided with readings 9 arranged at the inner arc boundary of the marks 8. Arrangements are provided so that the index 7 may be caused to traverse the scale 4, at any desired place between the inner and outer boundaries of the scale 4. By varying the angular spacing between the inner and the outer ends of marks 8, it is possible to obtain various scale readings corresponding to a given angular movement of the dial, by adjusting the radial position of the pointer. Thus, in the dial 1, the inner ends of marks 8 are spaced apart uniformly, but are angularly farther apart than are the outer ends of marks 8. With pointer 5 in the position shown, a given angular movement of dial 1 will give a greater scale reading than if the pointer were nearer the outer end of the marks. In this way, it is possible to bring the scale reading into close harmony with the actual measurement of the metering or other measuring apparatus with which it is connected. By arranging that a transverse arcuate path midway between the arcs defining the inner and outer ends of marks 8 corresponds to a normal operation of the measuring apparatus, adjustment of pointer 5 inwardly from this line toward center 2 of the dial will serve to correct for measuring apparatus which is running above normal, while moving the pointer outwardly from this line will compensate for measuring apparatus which is less than normal.

Brief consideration will show that the greater the angular difference in the spacing between the outer ends and the inner ends of scale marks 8, the greater will be the range of variation obtainable by adjustment of pointer 5. At the same time, it is desirable to avoid too great an inclination of the scale marks 8 with respect to a radial line, as such inclination makes accurate reading of the scale difficult. For this reason, the marks 11 and 12 at the extreme ends of scale 4 are given inclinations equal in amount but in opposite directions with respect to a radial line.

The pointer 5 is mounted so that the index 7, when it is adjusted, moves always to stay on the zero line 11, at the dero position of the dial 4. As will be hereinafter explained, this makes it unnecessary to adjust the angular position of the dial on its movable support.

One manner in which the pointer may be thus adjusted is shown in Figs. 1 and 2. Therein pointer 5 has a lower arcuate portion 14 positioned in proximity to the scale 4 and carrying the index 7 with which the zero mark 11 on the scale coincides for the zero position of the dial. Extending upwardly from the portion 14 is an inclined shank 15 which is slidably mounted in a groove 16 on the housing 6. Shank 15 is provided with a central slot 17, through which a screw 18 extends, threadedly engaging the housing. A washer 19 is provided under the head of screw 18. By tightening screw 18, the pointer is held against movement. If the screw is loosened, the pointer may be shifted in groove 16. Since groove 16 has the same inclination as the mark 11, the index 7 will always be in alinement with the mark for zero position of the dial.

The adjustment of the pointer to bring the scale readings into harmony with the quantities measured by the measuring apparatus is very simple. The measuring apparatus is actuated until the maximum quantity which the scale is graduated for, or even a lesser quantity, has been delivered as determined by independent measuring means. This may bring scale mark 14 into the position of Fig. 2, where it is shown for illustrative purposes as failing to register with the index 7, showing that the dial has moved less than the angle required for accurate indication for the particular transverse path chosen. The pointer 4 is then adjusted in groove 16 to bring the index 7 into registry with scale mark 14. Due to its inclined mounting it will still register with the zero mark 11 when the dial returns to the zero position, and it will also give a correct reading at any intermediate point.

It will be understood that a scale of this type is equally suitable for a stationary dial and moving pointer, the pointer being adjustable in the direction of the zero mark. Such an arrangement incorporating a straight scale is shown in Fig. 3. Therein the scale 20 includes scale markings 21, the spacing between the upper ends of the marks being less than that between the lower ends, in a manner analagous to the scale of Fig. 1. The end marks, 22 and 23, corresponding respectively to zero and maximum are similarly inclined by equal and opposite amounts. The moving pointer 24 carries an adjustable index or finger 25 which is slidable in the direction of the inclination of zero mark 22. Finger 25 may be attached to the pointer in a manner similar to the mounting of pointer 5 on casing 6. Thus, pointer 24 has a channel shaped extremity 26 for receiving finger 25 and threadedly carries a screw 27 passing through slot 28 in the finger. The screw 27 serves to secure the finger in adjusted position. The calibrating is done as in the first form; that is, the pointer 24 need be moved only to the correct scale line at any measuring point.

Fig. 5 shows a form of the invention embodying an adjustable dial, as well as a moving and a fixed pointer. Such an arrangement is useful where it is desired to set the dial to some predetermined quantity; and the traverse of the moving pointer between zero and the set quantity sets in motion a sequence of events at the conclusion of the traverse; as for example, to cause a termination in the delivery of the measured quantity. As an example of this, a batch delivery system may be cited. It is to be understood that the batch may be determined by weight, volume, or time, the batch being delivered as the pointer traverses the scale between zero and the set quantity. At the completion of the cycle, the pointer returns to its initial position, ready for a succeeding cycle. An example of such an arrangement is shown and described in a copending application, filed December 27, 1938, Serial No. 247,966 and entitled "Measuring device for liquids," in the names of Francis W. Guibert and Frederic B. Fuller.

In this form of the invention, the dial 30 may be considered as a stationary dial, with which cooperates an angularly movable pointer structure 40. This pointer structure 40 is shown as pivoted at the center of the circular dial and movable from the zero indicating position of Fig. 5 in a clockwise direction to traverse the scale marks 31. As in the form illustrated in Figs. 1 and 2, these scale marks are so arranged that the end marks 37 and 57 are inclined in opposite directions.

The pointer structure 40 includes as before an index finger 41. This index finger 41 may be adjustable in the direction of the zero scale mark 37, as by the aid of a channel guide 42 incorporated in the pointer structure 40. A screw 43 is provided for maintaining the adjustment of the pointer structure.

In the present instance the mechanism is such that the pointer structure 40 has a definite stop in the zero position. This stop is indicated diagrammatically by the pin 58 of Fig. 5, shown as in the path of the pointer structure, and as serving to stop the pointer with respect to the dial in the zero position. Although the stop pin 58 is shown as attached to the upper face of the dial 30, in an actual embodiment such as illustrated in the prior application referred to above, this stop may take other forms.

The arrangement may be such that upon the arrival of the pointer structure 40 to a predetermined point along the dial 30, certain automatic actions are effected, such as the making or breaking of a circuit, or opening or closing a valve or the like. The dial is shown in this instance as graduated in gallons of delivery of a liquid such as water, and the arrangement is for stopping the delivery of liquid after a definite number of gallons is delivered.

The position of the pointer structure 40 where the automatic actions take place, is indicated in Figs. 6 and 7. The adjustment of the amount of delivery in gallons is provided for by angularly adjusting the dial 30, so that the angular traverse from the zero point of the dial to this fixed position of Figs. 6 and 7 is varied. The starting point of the cycle is always from the zero point of the dial, the stop mechanism 58 ensuring that the pointer structure 40 will always start from this position.

For the dial adjustment, there is diagrammatically illustrated a pinion 46 meshing with gear teeth 45 arranged on the dial support. The pinion 46 is indicated as rotatable by handle structure 47. It is apparent that the farther the dial structure is adjusted in a counterclockwise direction, the larger the indication must be before the automatic actions take place. After the automatic functions are initiated, appropriate mechanism is provided for causing the return of the pointer structure to the starting position of Fig. 5, in preparation for a succeeding cycle of delivery and indication.

The manner of calibration is entirely similar to that discussed in connection with the form of the invention illustrated in Figs. 1 and 2. For this purpose the apparatus is caused to deliver a predetermined measured quantity of the liquid; for example, the maximum delivery of thirty-five gallons. For this calibrating function the dial 30 is rotated to such a point by trial as to cause the delivery of exactly thirty-five gallons before the pointer structure 40 reaches the position of Figs. 6 and 7 and thereafter returned to the zero position on the scale. We will assume that for this quantity of liquid delivered, the pointer structure 40 falls off of the maximum dial mark 57, as indicated in Fig. 7. To calibrate the device all that is necessary to do is at this point to adjust the pointer 41 in the channel 42 so as to bring the pointer 41 exactly to the scale mark 57. This adjustment does not in any way interfere with the accurate registry of the pointer structure with the zero mark 37, when the pointer structure is returned to starting position.

It is convenient to make it possible to indicate the quantity for which the dial mechanism is set for this automatic operation. For this purpose, another pointer structure is utilized, which may be stationary and which cooperates with the scale marks 31. Thus the stationary pointer 32 cooperates with the dial 30 to indicate on the dial the quantity to be measured in any one cycle. This pointer carries an index mark 33 and is adjustable in an inclined slot 34 in the case 35. The screw 36 serves to hold this pointer in adjusted position. The inclination of the slot 34 coincides with the inclination of the pointer 41 when it is in the position of initiating the automatic action as indicated in Figs. 6 and 7. At the conclusion of the process of calibration as just described, and after the pointer structure 40 has been adjusted to coincide with the chosen calibrating mark (such as 57), the pointer structure 32 is also moved to coincide with the indicating point of the pointer structure 41 in that position.

Thereafter the dial 30 may be set to deliver any amount between zero and the maximum amount, and this setting will be accurately indicated by the mark 33 on the dial 40.

The cycle of operation of the mechanism may be summarized. After the dial 30 is adjusted to indicate the desired delivery by the aid of the mark 44, the mechanism may be started. The pointer structure 40 moves from its zero position of Fig. 1 to the termination position of Fig. 7. At all times this moving pointer structure 40 indicates the amount of liquid that has actually been delivered. When the pointer structure 40 coincides with the index 33, the delivery is terminated, and the pointer structure 40 is automatically returned against the stop 58 for the beginning of a new cycle of delivery.

What is claimed is:

1. In an indicating mechanism having a relatively movable scale and pointer, the scale having division marks, and the pointer, in performing its indicating operation, traversing a path transverse to the division marks, said marks being so formed that the scale readings are a function of the particular transverse path, whereby corrected readings accurately conforming to the indicated quantities may be secured, the beginning division mark deviating from a direction normal to the relative indicating movement between the pointer and the scale, and means for making a compensating adjustment between the pointer and the scale in a direction corresponding to the direction that maintains said pointer and the beginning division mark in coincidence when the pointer and scale are in beginning position.

2. In an indicating mechanism having a relatively movable scale and pointer, the scale having division marks, and the pointer, in performing its indicating operation, traversing a path transverse to the division marks, said marks being so formed that the scale readings are a function of the particular transverse path, whereby corrected readings accurately conforming to the indicated quantities may be secured, the beginning division mark deviating from a direction normal to the relative indicating movement between the pointer and the scale, and means for making a compensating adjustment of the pointer in a direction corresponding to the direction that maintains said pointer and the beginning division mark in coincidence when the pointer and scale are in beginning position.

3. In an indicating mechanism including a relatively movable scale member and pointer member, said scale member having a series of scale marks extending transversely to the path of relative travel between the pointer and the scale, and means for adjusting the pointer member, whereby the position of said transverse path on the scale may be varied, said scale marks being so arranged that the readings depend upon the chosen transverse path, said means ensuring that when the pointer is at one of the limits of the scale, the adjustment of the pointer maintains the pointer on the corresponding limiting scale mark.

4. In an indicating mechanism including a relatively movable scale member and pointer member, the relative movement between said members being in accordance with the quantity to be measured said scale member having a series of scale marks extending transversely to the path of relative travel between the pointer and the scale, said scale marks being inclined at progressively different angles with respect to the path of travel, means whereby the relative positions of said members may be varied to alter the relative position of said path of travel, said means including means forming a guide for one of said members, said guide having the same inclination as the beginning mark of said scale, and means to secure said member against movement in said guide.

5. In an indicating mechanism including a relatively movable scale member and pointer member, said scale member having a series of scale marks extending transversely to the path of relative travel between the pointer and the scale, said scale marks being inclined at progressively different angles with respect to the path of travel, the length of said pointer being arranged for adjustment relative to the scale in a direction oblique to the path of travel, said obliquity coinciding with the inclination of the scale mark corresponding to the beginning position.

6. In a device of the character described, a relatively movable scale member and pointer member, scale marks on the scale member inclined at progressively differing angles with respect to each other, said pointer having a path of travel transverse to said scale marks for giving a scale reading, said scale member and said pointer member also being relatively adjustable in a direction transverse to said path of travel, the direction of said adjustment coinciding with the direction of the beginning mark on said scale.

7. In a device of the character described, a relatively movable scale member and pointer member, scale marks on the scale member, the pointer having a path of travel transverse to the scale marks, the scale mark at an intermediate point of the scale being normal to said path of travel, the scale marks on opposite sides of the midpoint being inclined with respect to said path, the degree of inclination progressively increasing with the distance of the marks from the intermediate point, the degree of inclination of corresponding marks on opposite sides of the point being opposite in direction, the scale member and pointer member being relatively adjustable in a direction transverse to as well as oblique to the path of travel, the direction of the adjustment corresponding to the direction of a mark on the scale.

8. In an indicating mechanism adapted to be compensated for accurate calibration, a scale member, a pointer member, one of said members being movable in an indicating direction, said scale member having a series of scale lines extending transversely to the path of said movement, and means for adjusting one of said members so as to cause the pointer member to cooperate with the scale lines along any desired path transverse to said lines, said pointer member having an indicating end, the movement between said pointer member and said scale member being in response to the quantity being measured, said path determining the degree of correction applied to the reading of the mechanism, said means comprising an adjustable pointer setter having an index adapted to cooperate with the pointer member to facilitate the compensating adjustment of the scale and pointer members.

FRANCIS W. GUIBERT.
FREDERIC B. FULLER.